United States Patent Office 3,417,091
Patented Dec. 17, 1968

3,417,091
NITRO IMIDAZOYL ETHYL PYRIDINES
AND QUINOLINES
Siegfried Pickholz and Maurice Shapero, London,
England, assignors to Ward Blenkinsop & Company Limited, London, England, a British company
No Drawing. Filed May 4, 1966, Ser. No. 547,413
Claims priority, application Great Britain, May 10, 1965,
19,718/65
11 Claims. (Cl. 260—288)

ABSTRACT OF THE DISCLOSURE

Mononitro imidazoyl ethyl pyridines and quinolines, useful as anti protozooans, and alternative processes for obtention are described.

---

This invention relates to substituted imidazoles having pharmacologically valuable properties.

In accordance with the present invention there is provided a 1-substituted mononitroimidazole having the general formula

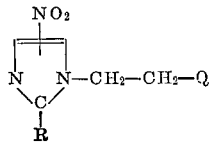

in which R is a hydrogen atom or an alkyl group having one to six carbon atoms, Q is a pyridyl, quinolyl or alkylpyridyl group, which alkylpyridyl group has one to four carbon atoms in the alkyl group, the beta-nitroimidazolylethyl group being present in the ortho- or para-position with respect to the nitrogen atom in the pyridyl, alkylpyridyl or quinolyl group.

The compounds of the present invention have a nitro substituent in the 4- or 5-position in the imidazole ring.

The substituent R in the 2-position in the imidazole ring is preferably either a hydrogen atom or a methyl group but may be an ethyl, n-propyl, isobutyl or hexyl group.

When Q is an alkylpyridyl group the alkyl group is preferably a methyl group; however, other alkyl groups having two, three or four carbon atoms may be present, e.g., an ethyl, n-propyl, isopropyl, n-butyl or isobutyl group. When Q is a quinolyl group the grouping may be that of quinoline or of isoquinoline. Only ortho substitution is possible in the case of the isoquinolyl group.

In accordance with a feature of the invention compounds having the above general formula may be produced by a process which comprises heating a mononitroimidazole having the general formula

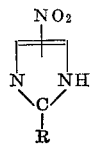
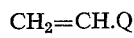

in which R is as above defined, with a vinyl-substituted heterocyclic compound having the general formula $$CH_2=CH.Q$$

in which Q is as above defined.

The mononitroimidazoles used in the above process are produced by the mononitration of imidazole and the 2-alkyl-imidazoles having one to six carbon atoms in the alkyl group, for example 2 - methyl - imidazole, 2 - ethyl-imidazole and 2-isobutyl-imidazole.

The vinyl-substituted heterocyclic compounds used in the above process include 2-vinylpyridine, 4-vinylpyridine, 2-methyl - 6 - vinylpyridine, 2-ethyl-6-vinylpyridine and 2-vinylquinoline.

The reactants may be heated together in substantially stoichiometric proportions or an excess of either may be employed. On account of the tendency of vinyl pyridines to polymerise at raised temperatures it is preferred to employ an excess over the stoichiometric proportion of the vinyl-pyridine or -quinoline. It is also preferred to carry out the condensation reaction in the presence of an acid condensing catalyst. Suitable catalysts for this purpose are the volatile alkane carboxylic acids such as acetic and propionic acids. Alkaline condensing catalysts have also been found to be advantageous especially organic bases such as the ammonium bases and the O-alkyl derivatives thereof, e.g. benzyl trimethylammonium methoxide. The condensation may be carried out in the presence of a polymerisation inhibitor such as hydroquinone.

According to an alternative feature of the invention compounds having the above general formula may be produced by a process which comprises mononitrating a 1-substituted imidazole having the general formula

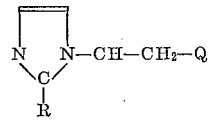

in which R and Q are as above defined. Imidazoles having the above general formula may be produced following the procedure described by Profft and Georgi, Liebig's Annalen, volume 643, pages 136 et seq. (1961). Briefly, this procedure involves heating imidazole or a C-alkyl-imidazole having one to six carbon atoms in the C-alkyl group with the vinyl pyridines and the vinylalkylpyridines such as 2-vinyl-6-methylpyridine. The reaction may be performed by heating the reactants together, preferably in the presence of an acid condensation catalyst. The reaction may likewise be applied to the monovinylquinolines. A polymerisation inhibitor such as hydroquinone may be present in the reaction mixture.

The mononitration may be carried out in various ways. Thus, a nitric acid salt of the beta-imidazolylethylpyridine or quinoline may first be prepared and then dissolved, preferably gradually, in concentrated sulphuric acid, cooling meantime. Alternatively, the beta-imidazolylethylpyridine or quinoline may first be dissolved in a mixture of a slight excess of nitric acid and water and concentrated sulphuric acid added to the resulting solution whilst cooling. Other nitration procedures may also be adopted if desired.

The products obtained by the two methods discussed above are not necessarily identical. A nitro group can enter the imidazole ring in either the 4- or the 5-position. When R is a hydrogen atom the products of the two processes are identical. This is due to the tautomerism of the imidazole ring. Thus, for each of the imidazolylethylpyridines, -alkylpyridines and -quinolines there is only one mononitroimidazolyl derivative. When the substituent R is an alkyl group the nitration procedure gives rise to a mixture of the two theoretically possible isomers. The 5-nitrocompounds are the more active and can readily be separated from the reaction product by making use of their greater solubility in aqueous acetone.

When R is an alkyl group having one to six carbon atoms such as a methyl or ethyl group different mononitroimidazolyl derivatives are obtainable by the two methods of preparation outlined above, one of which will be the 4-nitroimidazole derivative whilst the other is the 5-nitroimidazole derivative. It has been found that when a mononitro-2-alkylimidazole condenses with a vinylpyridine or a homologue thereof the products contain the nitro group in the 4-position in the imidazolyl ring whilst when a preformed 2-alkylimidazolylethylpyridine or a homologue thereof is mononitrated the nitro group enters the 5-position to a major extent. This orientation has been established from the infra-red spectra of the compounds.

The invention enables products to be prepared which are of pharmalocolgical interest in the treatment of protozoal infections due to Trichomonas vaginalis and entamoeba histolytica. Of particular interest are those products in which $R^1$ is a hydrogen atom, R is an alkyl group having one to four carbon atoms, e.g. a methyl or ethyl group, and the group Q is linked to the ethylene chain in the para position. Thus, the compound produced in accordance with Example 8 has been found to inhibit the growth of entamoeba histolytica in vitro at a concentration of 1:160,000 and that of Trichomonas vaginalis as a concentration of $1:3\times10^7$.

The following examples illustrate the nature of the invention:

Example 1

A mixture of 4(5)-nitroimidazole (4 g.), 2-vinylpyridine (6.5 g.) and glacial acetic acid (1 g.) were heated under reflux at 120–140° C. for 6 hours. The solution was cooled, 100 ml. of water added and the product dissolved by refluxing. The solution was filtered with charcoal, 10 ml. of alcohol was added to the filtrate which was then allowed by crystallise. The product was filtered and washed with cold water and dried.

1(2'-[α-pyridyl]ethyl)-4-nitroimidazole was obtained as a pale buff coloured powder, melting point 107–108° C.

Found: C=55.2%; H=4.59%; N=25.82%. Calculated for $C_{10}H_{10}O_2N_4$: C=55.2%; H=4.59%; N=25.7%.

Example 2

1-(2'-[α-pyridyl]ethyl)imidazole (5 g.), prepared according to the procedure of Profft and George (loc. cit.) was treated with warm 25% aqueous nitric acid until acid to Congo red paper and then cooled. The nitrate which crystallised out was filtered off and added portionwise with cooling to 10 ml. of concentrated sulphuric acid. The reaction was completed by heating and the mixture cooled and poured on to crushed ice. The solution was then neutralised with aqueous ammonia and after cooling the buff coloured precipitate was filtered off, washed, dried and crystallised from benzene with charcoal. On cooling almost white crystals of 1-(2'-[α-pyridyl]ethyl) 4-nitroimidazole, melting point 107–108° C. was obtained, identical with the compound described in Example 1.

Example 3

4(5)-nitroimidazole (8 g.) 4-vinylpyridine (15 g.), glacial acetic acid (2 g.) and hydroquinone (0.1 g.) were mixed and heated for 6–7 hours at 120–130° C. The mixture was evaporated under reduced pressure and the dark residue dissolved in 20 ml. of warm acetone. 50 ml. of water were added together with activated charcoal and the solution boiled and filtered. The solid material which crystallised on standing was filtered off, washed and re crystallised with activated charcoal from 25 ml. of ethyl alcohol. The solution was cooled, 20 ml. of ether added and the precipitate filtered, washed and dried. Buff coloured crystals of 1-(2'-[γ-pyridyl]ethyl)-4-nitroimidazole were obtained, melting point 142–144° C.

Found: C=55.34%; H=4.76%; N=25.95%. Calculated for $C_{10}H_{10}O_2N_4$: C=55.20%; H=4.60%; N=25.70%.

Example 4

1-(2'-[γ-pyridyl]ethyl)imidazole (5 g.) was dissolved in 12 ml. of concentrated nitric acid and 3 ml. of water and the solution added portionwise to 15 ml. of concentrated sulphuric acid with cooling. The nitration was completed by heating for 1–1½ hours and the clear solution poured on to crushed ice and neutralised to Congo red paper with aqueous ammonia. The mixture was heated to 60° C., treated with activated charcoal and filtered. The clear solution was then neutralised to pH 6–6.5 with aqueous ammonia and the buff coloured precipitate which formed on standing was filtered, washed and dried. It was recrystallised from dilute alcohol to give 1(2'-[γ-pyridyl]ethyl)-4-nitroimidazole, melting point 143–145° C., identical with the compound obtained in Example 3.

Example 5

2-methyl-4(5)-nitroimidazole (12.7 g.), 2-vinylpyridine (20 g.) and glacial acetic acid (1.5 g.) were heated for 7 hours at 120–130° C. The mixture, which became semi-solid on standing, was dissolved in 30 ml. of hot ethyl alcohol, treated with activated charcoal and filtered. The product was separated by filtration and washed with alcohol and ether. The mother liquors and washings on concentration gave a second crop. The combined crops were recrystallised from dilute ethyl alcohol to give white to buff coloured crystals, melting point 100–102° C. This is 1-(2'-[α-pyridyl]ethyl)-2-methyl-4-nitroimidazole.

Found: C=56.92%; H=5.19%; N=24.3%. Calculated for $C_{11}H_{12}O_2N_4$: C=56.90%; H=5.20%; N=24.10%.

Example 6

2-methylimidazole (16 g.), 2-vinylpyridine (40 g.), glacial acetic acid (1 g.) and hydroquinone (0.5 g.) were heated to 120–130° C. for 7 hours and the excess vinylpyridine removed by heating under reduced pressure. When the last traces of vinylpyridine had been removed, 25 g. of crude 1-(2'-[α-pyridyl]ethyl)-2-methylimidazole was obtained as a dark viscous oil. This was dissolved in a mixture of 42 ml. of concentrated nitric acid and 8 ml. of water and 50 ml. of concentrated sulphuric acid was added with cooling. The reaction was completed by heating and the clear solution cooled and poured on to crushed ice. The pH was adjusted to about 3 by the addition of aqueous ammonia and the warm solution treated with activated charcoal and filtered. The filtrate was adjusted to pH 7 by the addition of aqueous ammonia and the precipitate filtered off, washed with water and dried. The crude product was dissolved in aqueous acetone (10 ml. of acetone and 40 ml. of water) and the solution decanted from the gummy residue. This residue was twice extracted with 5 ml. of hot water and the combined extracts treated with activated charcoal and filtered. On cooling pale buff coloured needles were obtained which, on drying, had a melting point of 65–68° C. This is 1-(2'-[α - pyridyl]ethyl) - 2 - methyl - 5 - nitroimidazole and is isomeric with the product described in Example 5.

Example 7

2 - methyl - 4(5)-nitroimidazole (4 g.) and 4 - vinylpyridine (8 g.) were heated at 120–130° C. for 12 hours. The reaction mixture which solidified on cooling was treated with 10 ml. of alcohol, the solid dissolved by heating and the solution cooled to 0° C. The crystalline precipitate was filtered and washed with cold ethanol and recrystallised from hot ethanol in the presence of charcoal. After cooling, the crystals were filtered off, washed and dried. White to buff coloured needles, melting point 160–161° C. were obtained. The compound is 1-(2'-[γ-pyridyl]ethyl)-2-methyl-4-nitroimidazole.

Found: C=56.66%; H=5.35%; N=24.10%. Calculated for $C_{11}H_{12}N_4O_2$: C=56.90%; H=5.20%; N=24.40%.

Example 8

2-methylimidazole (10 g.) was condensed with 4-vinylpyridine (25 ml.) using the conditions described in Example 6 to yield buff coloured crystals of 1-(2'-[γ-pyridyl]-ethyl) - 2 - methylimidazole, melting point 99–101° C. This product was dissolved in a mixture of 65 ml. of concentrated nitric acid and 10 ml. of water and this solution added in portions to 75 ml. of concentrated sulfuric acid. The mixture was heated for 2–3 hours, allowed to cool and poured on to crushed ice. It was then neutralised with aqueous ammonia until just acid to Congo red paper. The solution was then treated with activated charcoal, filtered and the filtrate neutralised to pH 6.5 with cooling. The precipitated nitro compound was filtered off, washed and recrystallized from 100 ml. of warm aqueous acetone (1 volume of acetone to 9 volumes of water.) Grey crystals were obtained having a melting point of 108–111° C., consisting of 1-(2'-[γ-pyridyl]-ethyl)-2-methyl-5-nitroimidazole.

Found: C=56.85%; H=5.31%; N=24.27%. Calculated for $C_{11}H_{12}N_4O_2$: C=56.90%; H=5.20%; N=24.10%.

Example 9

A mixture of 4(5)-nitroimidazole (5 g.), 2-vinylquinoline (10 ml.), hydroquinone (0.2 g.) and Triton B (N-benzyltrimethylammonium methoxide) (0.5 ml.) was heated with stirring in an oil bath at 110–120° C. for 6 hours. A further 0.5 ml. portion of Triton B was added after 3 hours. On cooling a dark solution solidified and was dissolved in 30 mls. of dichlormethane by refluxing and filtered with the addition of activated charcoal. The product crystallized on cooling and a second crop was obtained by concentrating the mother liquors. The combined crops on recrystallisation yielded 1 - (2'-[quinolyl-2"]ethyl)-4-nitroimidazole, melting point 122–123° C.

Found: C=62.75%; H=4.51%; N=20.72%. Calculated for $C_{14}H_{12}O_2N_4$: C=62.70%; H=4.48%; N=20.90%.

Example 10

In a similar manner 2-methyl-4(5)-nitroimidazole was condensed with 2-vinylquinoline and the reaction product isolated by dissolving in methanol and precipitating by the addition of ether. The solid product obtained was recrystallized from methonal with the addition of activated charcoal and the product so obtained extracted with chloroform. The chloroform extract on evaporation yielded 1 - (2' - [quinolyl - 2"]ethyl)-2-methyl-4-nitroimidazole, melting point 167–169° C.

Example 11

A mixture of 4(5)-nitroimidazole (4 g.), 2-methyl-6-vinylpyridine (10 ml.), Triton B (0.5 ml.) and hydroquinone (0.2 g.) was heated under reflux with stirring at 120–140° C. for 4 hours. A dark solution was obtained which after cooling and prolonged standing deposited crystals. 10 ml. of ethanol was added to the mixture and after further cooling in an ice box the solid material was separated by filtration, washed first with a mixture of ether/alhocol (1:3 by volume) and then with diethyl ether and finally dried at low pressure. In this way 1-(2'-[2"-methylpyridyl-6"]-ethyl)-4-nitroimidazole was obtained. Melting point 100–102° C.

Example 12

A mixture of 2-methyl-4(5)-nitroimidazole (5 g.), 2-methyl-6-vinylpyridine (8 ml.), glacial acetic acid (1.5 ml.) and hydroquinone (0.2 g.) was heated under reflux with stirring at 130–140° C. for 6 hours. A viscous dark liquid was obtained, which was cooled and mixed with 20 ml. of diethyl ether. Finally divided crystals were formed in this way, which were filtered off after standing, washed with diethyl ether and then dried. The brownish product was dissolved in 15–20 ml. of warm ethyl acetate and the solution filtered off, leaving a residue which was insoluble in ethyl acetate. The filtrate was heated with charcoal and the mixture again filtered. On cooling the clear filtrate deposited white needles of 1 - (2' - [2" - methyl - pyridyl - 6"] - ethyl)-2-methyl-4-nitroimidazole. Melting point 107–109° C.

We claim:

1. A 1-substituted mononitroimidazole having the formula

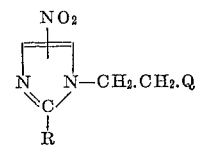

in which R is selected from hydrogen and alkyl groups having one to six carbon atoms and Q is selected from pyridyl, quinolyl and alkylpyridyl groups, said alkylpyridyl groups having one to four carbon atoms in the alkyl group, and the mononitroimidazolylethyl group being linked to the group Q in the ortho- or para-position with respect to the nitrogen atom of the pyridyl, quinolyl or alkylpyridyl group.

2. The mononitroimidazole claimed in claim 1 in which R is a hydrogen atom and Q is a pyridyl group linked in the ortho-position with respect to the nitrogen atom of said group.

3. The mononitroimidazole claimed in claim 1 in which R is a hydrogen atom and Q is a pyridyl group linked in the para-position with respect to the nitrogen atom of said group.

4. The mononitroimidazole claimed in claim 1 in which R is a methyl group, the nitro-group is in the 4-position in the imidazolyl ring and Q is a pyridyl group linked in the ortho-position with respect to the nitrogen atom of said group.

5. The mononitroimidazole claimed in claim 1 in which R is a methyl group, the nitro group is in the 5-position in the imidazolyl ring and Q is a pyridyl group linked in the ortho-position with respect to the nitrogen atom of said group.

6. The mononitroimidazole claimed in claim 1 in which R is a methyl group, the nitro-group is in the 4-position in the imidazolyl ring and Q is a pyridyl group linked in the para-position with respect to the nitrogen atom of said group.

7. The mononitroimidazole claimed in claim 1 in which R is a methyl group, the nitro-group is in the 5-position in the imidazolyl ring and Q is a pyridyl group linked in the para-position with respect to the nitrogen atom of said group.

8. The mononitroimidazole claimed in claim 1 in which R is a hydrogen atom and Q is a quinolinyl group linked in the ortho-position with respect to the nitrogen atom of said group.

9. The mononitroimidazole claimed in claim 1 in which R is a methyl group, the nitro-group is present in the 4-position in the imidazolyl ring and Q is a quinolinyl group linked in the ortho-position with respect to the nitrogen atom of said group.

10. The mononitroimidazole claimed in claim 1 in which R is a hydrogen atom and Q is a 2-methylpyridyl group linked in the ortho-position with respect to the nitrogen atom of said group.

11. The mononitroimidazole claimed in claim 1 in which R is a methyl group, the nitro-group is in the 4-position in the imidazolyl ring and Q is a 2-methylpyridyl group linked in the ortho-position with respect to the nitrogen atom of said group.

References Cited

UNITED STATES PATENTS

| | | | |
|---|---|---|---|
| 3,236,856 | 2/1966 | Parnell et al. | 260—309 |
| 3,256,295 | 6/1966 | Karmas | 260—309 |
| 3,280,139 | 10/1966 | Klosa | 260—309 |
| 3,299,090 | 1/1967 | Hoff et al. | 260—296 X |

ALEX MAZEL, *Primary Examiner.*

D. G. DAUS, *Assistant Examiner.*

U.S. Cl. X.R.

260—296, 309, 290, 283, 688; 161—65